Patented July 27, 1926.

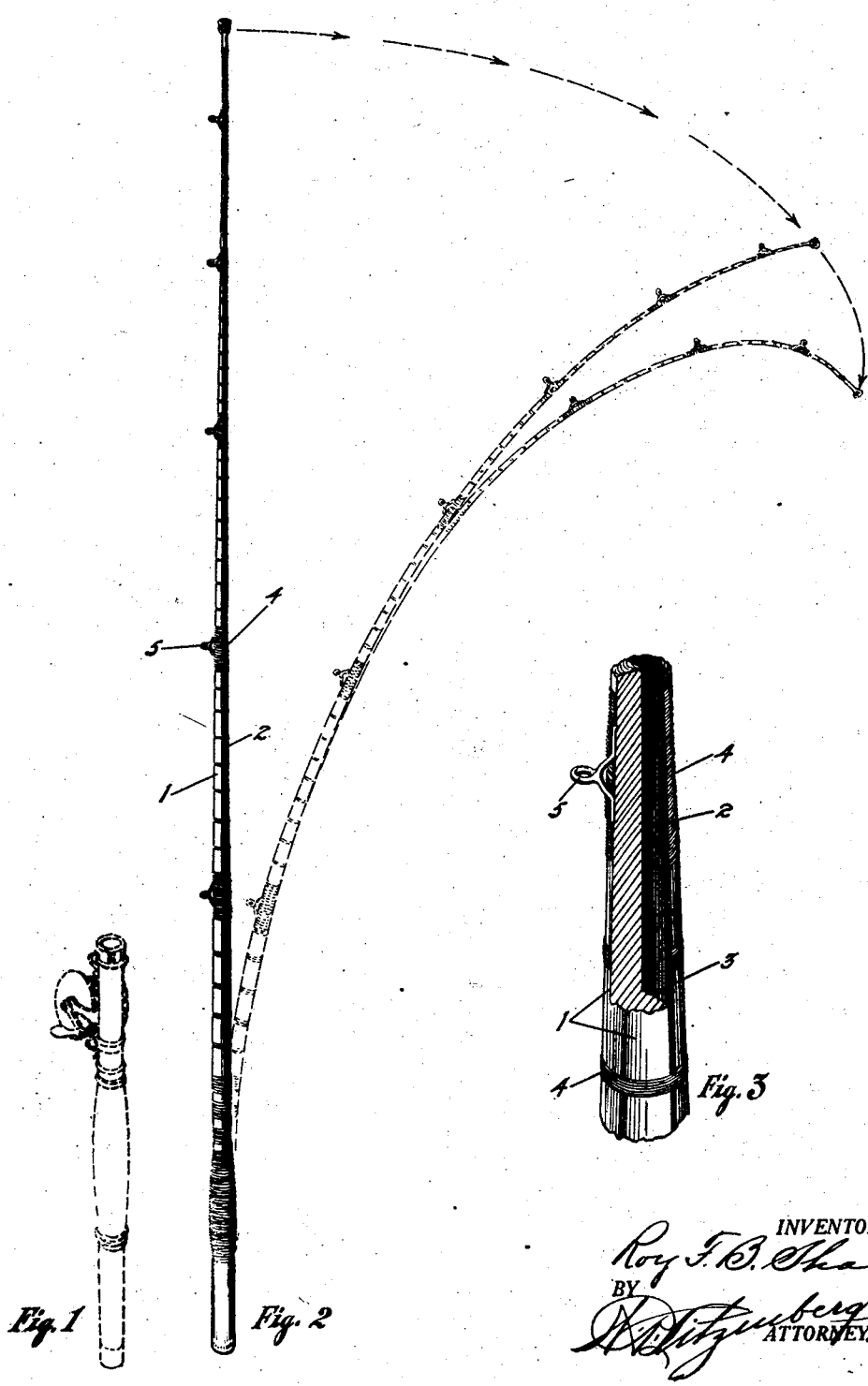

1,593,957

UNITED STATES PATENT OFFICE.

ROY F. B. SHAVER, OF LOS ANGELES, CALIFORNIA.

FISH ROD.

Application filed October 14, 1925. Serial No. 62,412.

The principal object of my invention is to provide a specially made fishing rod designed to return to its original alinement after undergoing severe and prolonged one-way flexing incidental to lifting a fish, and so building the rod as to best sustain that special one-way strain, rather than to make a rod in which universal flexing is expected and provided for, and I accomplish this result by so building my improved rod as to take advantage of the facts that wood when longitudinally stretched will resume its original length, while if compressed it will not. With this general property of woods in mind, I build my improved rods out of two different kinds of material, extending longitudinally of the rod from one end to the other, one longitudinal half of the rod being made of a material having great tensile strength and elasticity, such as hickory, and the other half thereof being made of a material which has a higher compression-resisting quality, such as palma brava, the two halves being glued together flatwise along a median plane for the entire length of the rod, making one unit of laminated construction, said rod being so assembled that the line guides and the material of great tensile strength and elasticity are on what in use is the upper or convexed side of the rod as flexed in lifting a fish, and which said upper side is then subjected solely to a tension or stretching strain by reason of the higher compression-resisting quality of the under, or concaved side of the rod, coupled with the fact that while the rod is flexed, the upper side is to a slight degree longer than the under side, the median plane, which is glued, taking no longitudinal strain.

In order to more fully explain my invention, I have illustrated the same on the accompanying sheet of drawings, in which,—

Figure 1 is a light broken line drawing of a handle, detached from the rod and forming no part of the invention;

Figure 2 is a side elevation of a fish rod embodying my invention, showing in light broken lines the manner in which a pole or rod is flexed or bent in use; and Figure 3 is an enlarged, fragmentary view, in section, to show the construction.

In building my fishing rods, two materials, as 1 and 2, are selected, the material 1, being such as will stretch longitudinally and contract without breaking, while material, 2, is such that it will withstand longitudinal compression strain with no diminution of length. The two halves are prepared to fit together flatwise, as at 3, the taper being gradual from the larger end to the smaller end, substantially as illustrated, the two halves being thoroughly glued and bound together from end to end. The binding, designated 4, is shown in connection with one of the line guide members, 5, Fig. 3.

Thus I have provided a durable and satisfactory fishing rod and one which will return to perfect alinement and will stand the strain of flexing in one-way repeatedly and will do this because it is constructed of materials specially designed for the service required and so related to each other that they cooperate in making this function possible without injury to the rod.

What I claim as new and useful and desire to secure by Letter Patents is:

1. A laminated fishing rod constructed of two longitudinal halves glued together lengthwise along the median plane, one of said halves being made of material having a stretching quality and the other of said halves being made of material of higher compression-resisting properties, whereby the glued joint is not subjected to any longitudinal or slipping strain.

2. A fishing rod of the character referred to, the upper longitudinal half of which is made of wood having stretching qualities and the lower half of which is made of wood having a higher compression-resisting quality, said halves being glued together along the median plane and bound with wrappings, and line guides arranged along the upper half, whereby the correct position of the rod is indicated by said guides in order to determine the one-way flexing characteristic of said rod.

3. A fishing rod of the character shown and described, the upper longitudinal half is made of hickory and the lower longitudinal half is made of palma brava, glued together along the median plane and bound with wrapping, whereby said rod is made flexible in one-way without injury thereto, by reason of the stretching quality of hickory and the higher compression-resisting quality of the palma brava.

Signed at Los Angeles, Los Angeles county, California, this 7th day of October, 1925.

ROY F. B. SHAVER.